United States Patent
Ekonen et al.

(10) Patent No.: US 6,435,594 B1
(45) Date of Patent: Aug. 20, 2002

(54) TRANSFORMER CARGO COVER

(75) Inventors: Robert George Ekonen, Stockbridge; Bruce Wohlfield, Brighton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,832

(22) Filed: Jun. 13, 2001

(51) Int. Cl.[7] .................................................. B60P 7/02
(52) U.S. Cl. ................... 296/100.09; 296/165; 296/173
(58) Field of Search ................................ 296/156, 165, 296/171, 173, 175, 26.04, 26.09, 100.02, 100.03, 100.04, 100.05, 100.09

(56) References Cited

U.S. PATENT DOCUMENTS

| | | | |
|---|---|---|---|
| 3,447,830 A | | 6/1969 | Willison |
| 3,690,719 A | * | 9/1972 | Yount .................. 296/26.04 X |
| 3,768,858 A | * | 10/1973 | Boismier ........... 296/100.09 X |
| 4,027,912 A | * | 6/1977 | Pacca ...................... 296/165 X |
| 4,057,284 A | * | 11/1977 | Blank ...................... 296/173 X |
| 4,294,484 A | * | 10/1981 | Robertson ............... 296/156 X |
| 4,768,824 A | * | 9/1988 | Andonian ............... 296/173 X |
| 4,815,786 A | | 3/1989 | McRay |
| 4,848,830 A | | 7/1989 | Parson |
| 5,316,357 A | | 5/1994 | Schroeder |

FOREIGN PATENT DOCUMENTS

CA 940968 1/1974

\* cited by examiner

Primary Examiner—Joseph D. Pape
Assistant Examiner—Jason Morrow
(74) Attorney, Agent, or Firm—Gigette M. Bejin

(57) ABSTRACT

A transformer cargo cover for a vehicle having an open cargo bed area includes a first and second lower panel each having an outside surface and a first and second upper panel each carried by and overlapping a predetermined portion of the outside surface of a corresponding lower panel.

14 Claims, 2 Drawing Sheets

TRANSFORMER CARGO COVER

BACKGROUND OF INVENTION

The present invention relates to automotive vehicle cargo covers, and more specifically, to a transformer cargo cover.

In the use of pick-up trucks and other vehicles with an open cargo bed, it is often desired to have a cover on the bed in order to protect the cargo load from the weather elements, as well as for security. Two different types of cargo bed covers include tonneau covers and caps. Tonneau covers are used when extra cargo space is not needed, as they are level with the top of the sides of the cargo bed. Caps are used when extra cargo space is required, as they are level with the top of the passenger portion of the vehicle.

In the use of vehicles with cargo beds, it is also often desired to increase the load capacity of the bed. To accomplish this, side extenders are used, which then bring the top of the sides of the cargo bed level with the top of the passenger portion of the vehicle, thereby increasing the load capacity.

In the past, these covers and side extenders have all been used to serve the desired purpose, but never in conjunction with one another, as they are all separate devices for different needs. They are also cumbersome in that they require more than one operator to put them on and remove them. Because they are removable, they also require extra storage space when not in use.

It would therefore be beneficial to have a single cargo cover that can function as a bed-level tonneau cover, a raised weather tight cap, and also be opened so as to function as side extenders to maximize load capacity, all without the need to remove the cargo cover, thereby providing versatility without requiring separate storage space.

It is therefore desired to provide a transformer cargo cover that can be positioned as a tonneau cover or a cap when a cover for cargo in the bed is needed, as well as positioned as side extenders when open cargo space is required for larger loads.

SUMMARY OF INVENTION

It is an object of the present invention to provide a transformer cargo cover that overcomes the disadvantages of the prior art.

It is a feature of the present invention that the transformer cargo cover function as a closed tonneau cover reconfigureable to a raised weather tight cap reconfigureable to an open top, side extended, cargo area.

The present invention advantageously provides a transformer cargo cover for a vehicle having an open cargo bed area includes a first and second lower panel each having an outside surface and a first and second upper panel each carried by and overlapping a predetermined portion of the outside surface of a corresponding lower panel.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
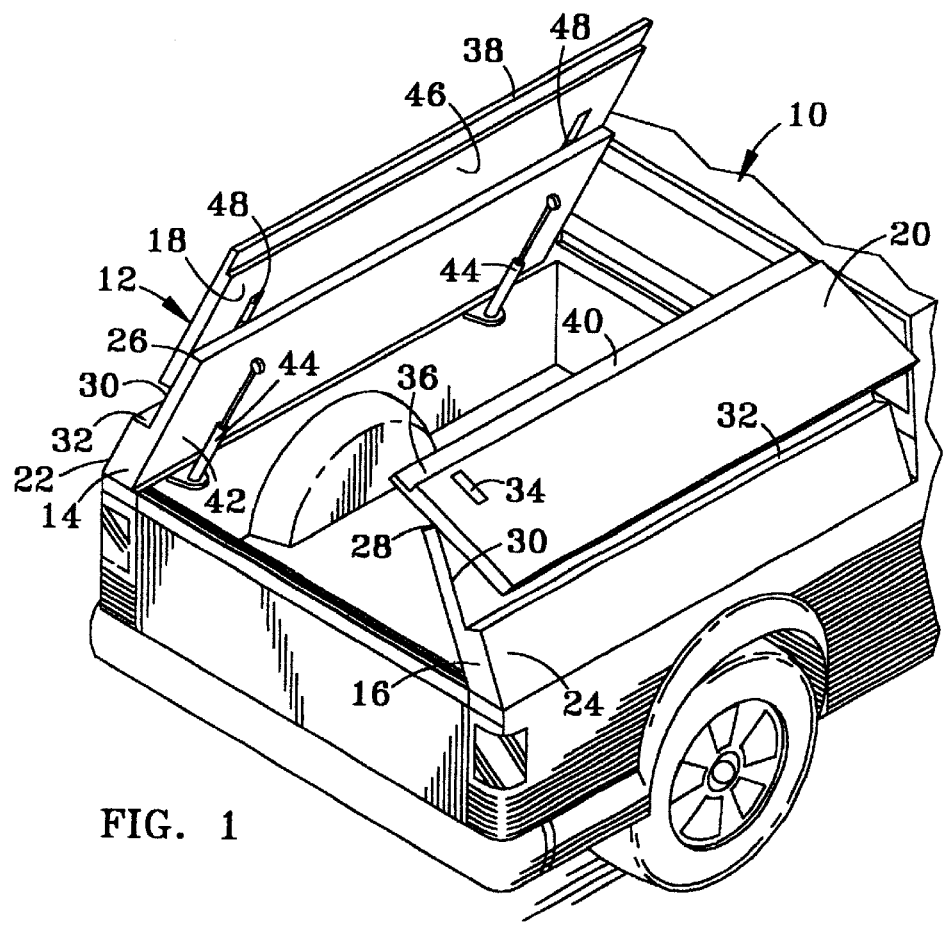
FIG. 1 is a perspective view of a vehicle with a transformer cargo cover in a transitional position according to the present invention.

Referring to FIG. 1, a vehicle 10 having a transformer cargo cover 12 is shown. The transformer cargo cover 12 consists of four panels, a left and right lower panel 14 and 16, and a left and right upper panel 18 and 20. The left and right lower panels 14 and 16 are substantially rectangular shaped, as are the left and right upper panels 18 and 20.

The left and right lower panels 14 and 16 each have outside surfaces 22 and 24, respectively. The outside surfaces 22 and 24 of the lower panels 14 and 16 are indented mid-panel through to the inner most edges 26 and 28 of. the lower panels 14 and 16 so that the upper panels 18 and 20 can nest in indentations 30. The indentations 30 form a ledge 32 upon which the upper panels 18 and 20 rest. The lower panels 14 and 16 have an inner surface 42. The inner surface 42 of the lower panels 14 and 16 has hardware 44 at the front and rear. The hardware 44 has lift-assist and locking means, such as what is used on the rear door of a hatchback automobile and as is known in the automotive arts, and also has hinges that allow the lower panels 14 and 16 to have a pivotal range of movement of 90 degrees from the horizontal to the vertical. This hardware 44 also has a locking means as is known in the art, to lock the lower panels 14 and 16 into position. The hardware 44 may also be positioned at the edges of the lower panels 14 and 16 without departing from the scope of the present invention.

The upper panels 18 and 20 have operator handles 34 for use in placing the transformer cargo cover 12 into various positions described below. The upper panels 18 and 20 also come together to form an interlocking seam. The left upper panel 18 has an inner edge 36, which is the depth of the panel 18. Extending outwardly from this inner edge 36 at the top half is the left portion 38 of the interlocking seam. Correspondingly, the right upper panel 20 also has an inner edge 36. Extending outwardly from this inner edge 36 at the bottom half is the right portion 40 of the interlocking seam. When folded down, the top or left portion 38 rests on the bottom or right portion 40, thus forming the interlocking seam.

The upper panels 18 and 20 have latching mechanisms (not shown) at the front and rear, as well as at the interlocking seam, to secure the transformer cargo cover 12 once it is placed in the desired position. Any number of latching mechanisms could be used, as is known in the art. The upper panels 18 and 20 also have an inner surface 46. The inner surface 46 of the upper panels 18 and 20 and the indentations 30 of the lower panels 14 and 16 have hinge, sliding, and locking hardware 48 at the front and rear, which connect the upper panels 18 and 20 to the lower panels 14 and 16. The hinge of the hardware 48 allows the upper panels 18 and 20 to be pivoted from their vertical nested position to a horizontal position The hardware 48 also allows the upper panels 18 and 20 to be slid and locked using, for instance, a track and rollers or bearings, as is known in the cabinetry arts. For example, after the upper panels 18 and 20 are rotated to a horizontal position, they can then be slid towards each other until the left and right portions 38 and 40 of the interlocking seam meet.

Figure 2:
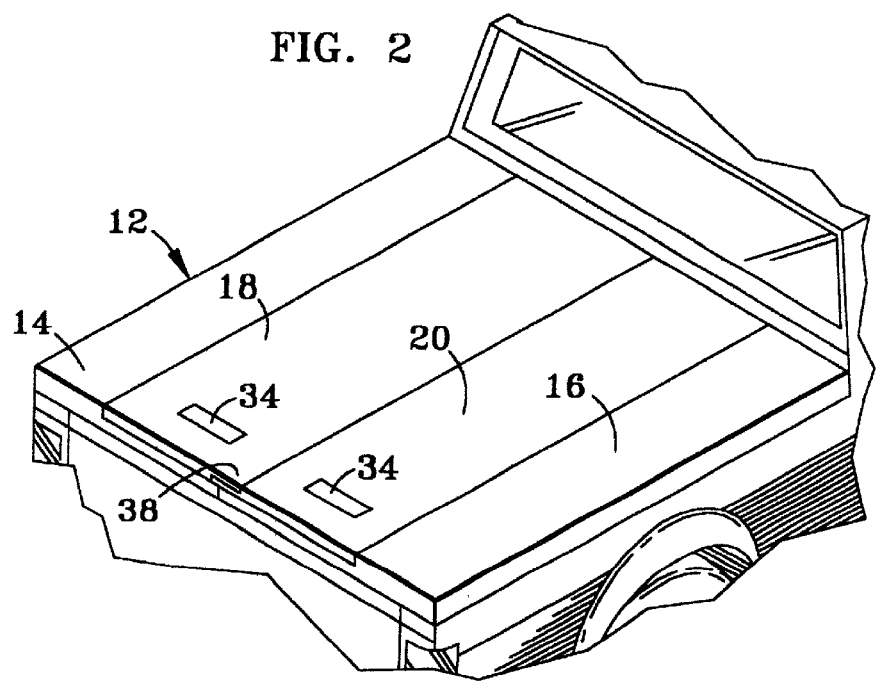
FIG. 2 is a perspective view of a transformer cargo cover in the closed tonneau position according to the present invention.
Figure 3:
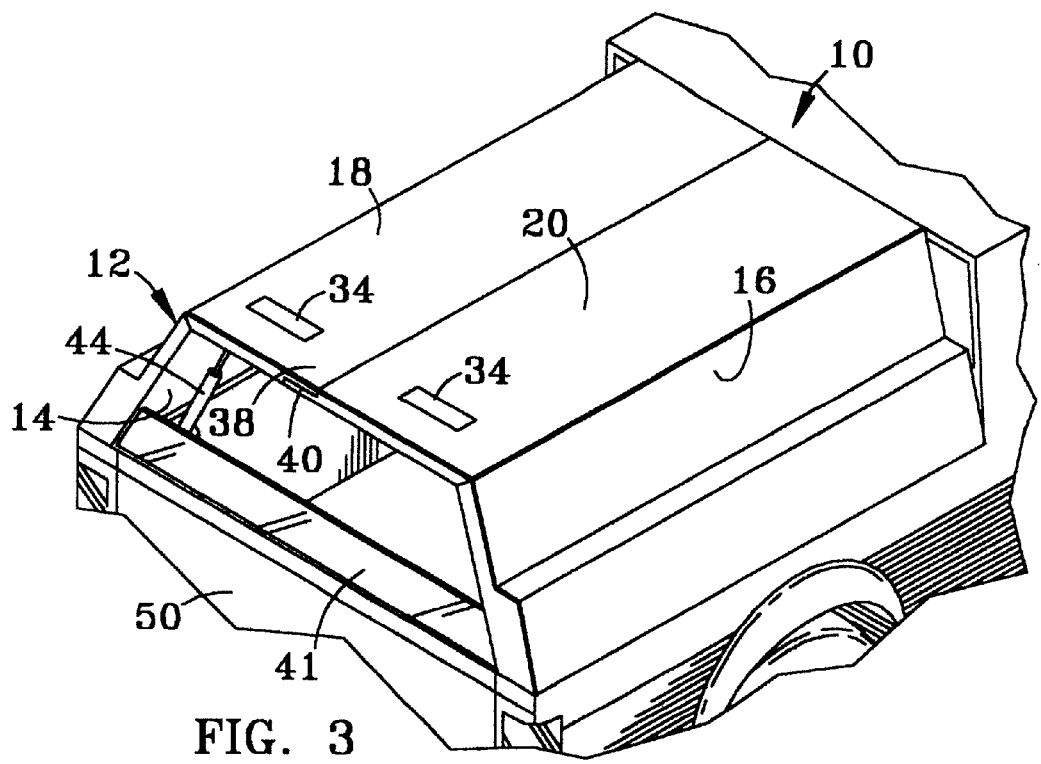
FIG. 3 is a perspective view of a vehicle with a transformer cargo cover in the raised weather tight cap position according to the present invention.

The transformer cargo cover 12 can be reconfigured from the tonneau cover position shown in FIG. 2 to the raised, preferably weather tight, cap position as shown in FIG. 3. To get the transformer cargo cover 12 into the cap position, first the latching mechanisms (not shown) are unlatched. Then the left upper and lower panels 18 and 14 are pivoted from the center so that they move toward a vertical position. The same is done to the right upper and lower panels 20 and 16, and both panels are locked into place. The right upper panel 20 is then rotated to the horizontal and slid toward the center of the bed area. The same is then done to the left upper panel 18 so that the interlocking seam is formed. The latching mechanisms at the front, rear, and interlocking seam are then refastened to secure the transformer cargo cover 12 in position. A panel 41, preferably glass or an integrated ramp, may be then slid up from the tailgate 50 to close off the rear area of the transformer cargo cover 12.

Figure 4:
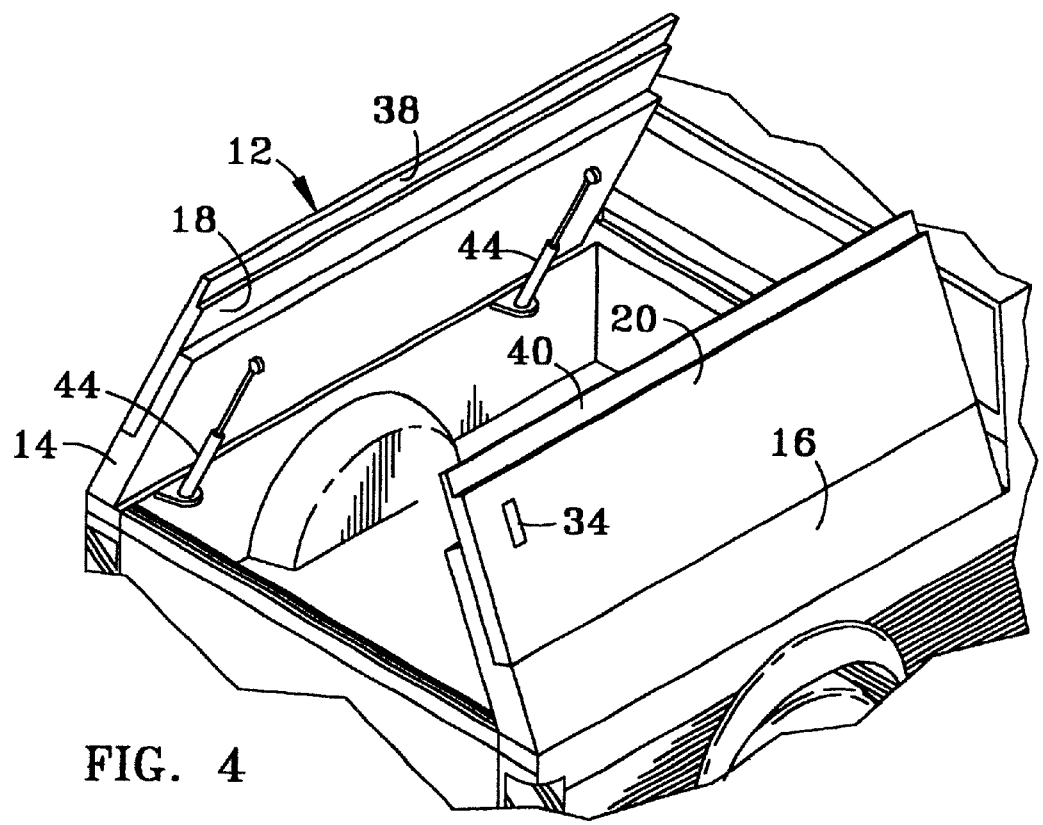
FIG. 4 is a perspective view of a transformer cargo cover in the opened side extender position according to the present invention.

The transformer cargo cover 12 can also be configured so as to function as a side extender when extra cargo space is needed, as shown in FIG. 4. From the tonneau position shown in FIG. 2, the latching mechanisms at the front, rear, and interlocking seam are unlatched. The upper panels 18 and 20 are already locked in their nested position. The lower panels 14 and 16 are each then raised to the vertical and locked into position via the lock and hinge hardware 44 at the front and rear of each of the panels 14 and 16, thus allowing an open cargo area with extended height sides. The upper panels 18 and 20 may also be rotated 180 degrees around and downward and positioned vertically adjacent to the lower panels 14 and 16 to accomplish a similar side extending function (not shown).

Regardless of the configuration of the transformer cargo cover 12, all four panels 14, 16, 18, and 20 at the front seal to a surface provided by the rear exterior of the passenger compartment (not shown). Also, a center high mount stop light (not shown) can be integrated into a latching mechanism, which can slide to fasten the two upper horizontal panels 18 and 20 at the rear.

While only one embodiment of the transformer cargo cover of the present invention has been described, others may be possible without departing from the scope of the following claims.

What is claimed is:

1. A transformer cargo cover for a vehicle having an open cargo bed area comprising:
    a first and second lower panel each having an outside surface, with an indent along the length of the panel thereby forming a ledge;
    a first and second upper panel each carried by a predetermined portion of the outside surface of the corresponding lower panel; and
    wherein a portion of each upper panel nests in the ledge of the corresponding lower panel thereby forming a continuous planar outside surface when aligned in coplanar fashion.

2. The transformer cargo cover as defined in claim 1, wherein the lower panels have a range of movement of substantially 90 degrees.

3. The transformer cargo cover as defined in claim 1, wherein the upper panels have handles for placing the panels into a predetermined position.

4. The transformer cargo cover as defined in claim 1, wherein the upper panels have corresponding extended portions that form a flat interlocking seam when the upper panels are aligned in coplanar fashion.

5. The transformer cargo cover as defined in claim 1, wherein the upper panels are adapted to slide with respect to the lower panels.

6. A transformer cargo cover for a vehicle having an open cargo bed area comprising;
    a first and second lower panel each having an outside surface, with an indent along the length of the panel thereby forming a ledge;
    a first and second upper panel each carried by the corresponding lower panel, wherein a portion of each upper panel nests in the ledge of the corresponding lower panel thereby forming a continuous planar outside surface when aligned in coplanar fashion; and
    wherein the panels are operable between a cover position where the upper and lower panels are horizontal, a cap position where the lower panels are vertical and the upper panels are horizontal, and an extender position where the upper and lower panels are vertical.

7. The transformer cargo cover as defined in claim 6, wherein the lower panels have a range of movement of substantially 90 degrees.

8. The transformer cargo cover as defined in claim 6, wherein the upper panels have operator handles for placing the panels into a predetermined position.

9. The transformer cargo cover as defined in claim 6, wherein the upper panels have corresponding extended portions that form a flat interlocking seam when the upper panels are aligned in coplanar fashion.

10. The transformer cargo cover as defined in claim 6, wherein the upper panels are adapted to slide with respect to the lower panels.

11. A transformer cargo cover for a vehicle having an open cargo bed area comprising:
    a first and second lower panel each having an outside surface, with an indent along the length of the panel thereby forming a ledge;
    a first and second upper panel each carried by a predetermined portion of the outside surface-of the corresponding lower panel, wherein a portion of each upper panel nests in the ledge of the corresponding lower panel thereby forming a continuous planar outside surface when aligned in coplanar fashion; and
    wherein the panels are operable between a cover position where the upper and lower panels are horizontal, a cap position where the lower panels are vertical and the upper panels are horizontal, and an extender position where the upper and lower panels are vertical.

12. The transformer cargo cover as defined in claim 11, wherein the lower panels have a range of movement of 90 degrees.

13. The transformer cargo cover as defined in claim 11, wherein the upper panels have operator handles for placing the panels into a predetermined position.

14. The transformer cargo cover as defined in claim 11, wherein the upper panels are adapted to slide with respect to the lower panels.

* * * * *